United States Patent [19]

Masatoshi

[11] Patent Number: 5,181,587
[45] Date of Patent: Jan. 26, 1993

[54] LOCK INDICATOR FOR CASTER

[75] Inventor: Kawanabe Masatoshi, Tokyo, Japan

[73] Assignee: Sugatsune Industrial Co., Ltd., Tokyo, Japan

[21] Appl. No.: 666,520

[22] Filed: Mar. 11, 1991

[30] Foreign Application Priority Data

May 23, 1990 [JP] Japan .................. 2-53865[U]

[51] Int. Cl.$^5$ .................................................. B60B 33/00
[52] U.S. Cl. ............................. 188/1.12; 16/35 R; 188/1.11
[58] Field of Search ..................... 188/1.11, 1.12; 16/35 R

[56] References Cited

U.S. PATENT DOCUMENTS

| 3,890,669 | 6/1975 | Reinhards | 188/1.12 |
| 4,479,566 | 10/1984 | Ishii | 188/1.12 |

FOREIGN PATENT DOCUMENTS

| 2340108 | 2/1975 | Fed. Rep. of Germany | 16/35 R |
| 1768319 | 10/1969 | United Kingdom | 16/35 R |
| 2054070 | 2/1981 | United Kingdom | 16/35 R |
| 2181343 | 4/1987 | United Kingdom | 16/35 R |
| 2211086 | 6/1989 | United Kingdom | 16/35 R |

Primary Examiner—Matthew C. Graham
Attorney, Agent, or Firm—Jacobson, Price, Holman & Stern

[57] ABSTRACT

A lock indicator for a caster having a push-button engaged in a push-button mounting hole formed from the outer periphery of a frame to the interior of the frame to be freely pressed for operating a stopper for locking a wheel, wherein the push-button engaged within the push-button mounting hole has cap shape, a transparent portion formed on the top portion thereof, and an indicator having indicating portions for respectively indicating a wheel locking state and a wheel lock releasing state in such a manner that the indicating portions of the indicator correspond to the transparent portion of the push-button to be internally mounted along the inner peripheral surface from the body to the top of the push-button, and one end of the indicator is secured into the frame. Thus, the lock indicator for the caster can simply and accurately confirm the locking state and the lock releasing state of the caster without special attention by precise indicating portions associated with a push-button thereof.

4 Claims, 5 Drawing Sheets

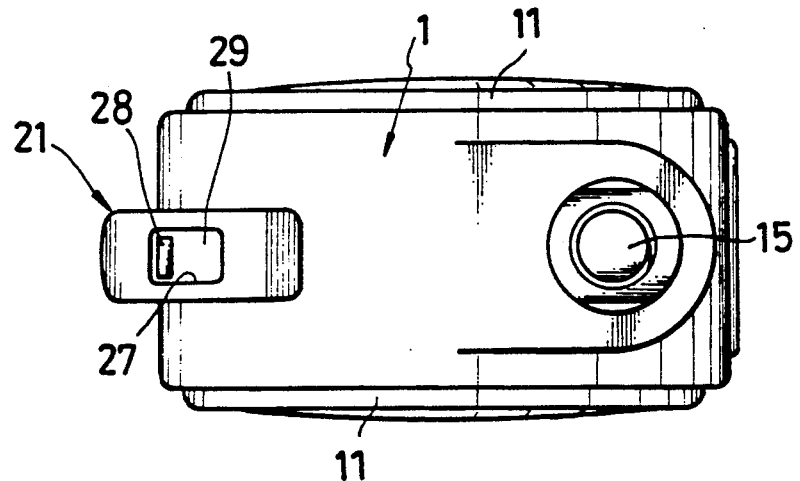
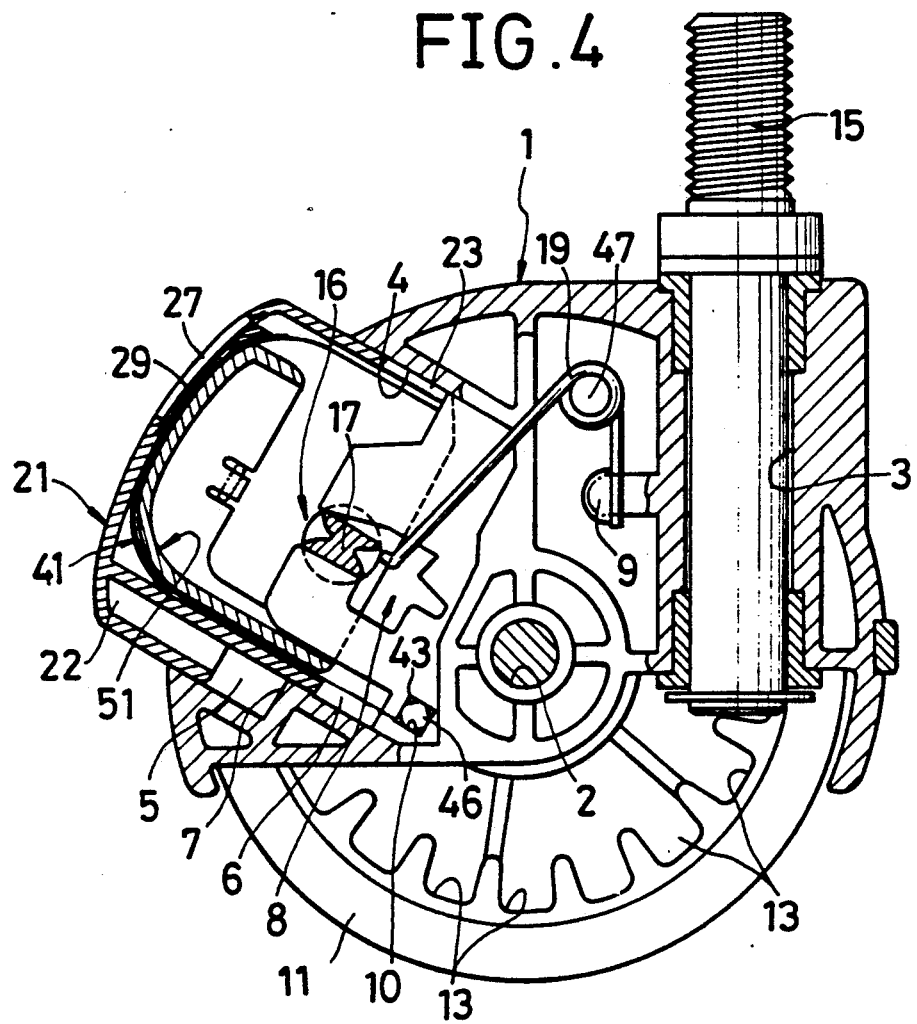

LOCK INDICATOR FOR CASTER

BACKGROUND OF THE INVENTION

1. Field of the Invention

This invention relates to a lock indicator for a caster to indicate the locking state and lock releasing state of the caster.

2. Description of the Prior Art

A conventional caster with a stopper which has a stopper for restricting the movement of a wheel has already been proposed as one of casters used to be mounted at furnitures such as a movable table, a wagon, a chair, etc., or transport implements such as a truck, etc.

Such a stopper is generally operated via a lever, a push-button, etc., provided at the frame of the caster.

In case of a lever operation type, whether or not a wheel is locked, i.e., the locking state and the lock releasing state of the caster are confirmed according to the operating position (inclination) of the lever projecting from the frame of the caster. In case of a push-button operation type, the same states as described above are confirmed from the pressing position (projecting amount) of the push-button projecting from the frame of the caster.

In case of the caster with a stopper, the locking state and the lock releasing state of the caster are confirmed according to the inclination of the lever or the projecting amount of the push-button, but since the caster itself is mounted underneath the furniture, the transport implement, etc., the state of the lever or the push-button tends to be erroneously identified by an operator erected for operating the furniture, the transport implement, etc.

Particularly, if the locking state of the caster is erroneously confirmed to be as the lock releasing state, even if the movement of the wheel is restricted, the furniture, the transport implement, etc., is forcibly pressed or pulled. Therefore, a stripe trace is not only formed by the wheel of the caster on the floor surface in a room, but the wheel of the caster is worn, deformed at various portions and hence the lifetime of the caster is shortened.

SUMMARY OF THE INVENTION

An object of the present invention is to provide a lock indicator for a caster which can eliminate the technical subject of the conventional caster and can simply and accurately confirm the locking and the lock releasing state of the caster without special attention by precise indicating means associated with a push-button thereof.

In order to achieve the above-described and other objects of the present invention, according to first aspect of the invention, there is provided a lock indicator for a caster having a push-button engaged in a push-button mounting hole formed from the outer periphery of a frame to the interior of the frame to be freely pressed for operating a stopper for locking a wheel, wherein said push-button engaged within said push-button mounting hole has cap shape, a transparent portion formed on the top portion thereof, and an indicator having indicating portions for respectively indicating a wheel locking state and a wheel lock releasing state in such a manner that the indicating portions of said indicator correspond to the transparent portion of said push-button to be internally mounted along the inner peripheral surface from the body to the top of said push-button, and one end of said indicator is secured into the frame.

According to second aspect of the present invention, there is provided a lock indicator for a caster according to the first aspect of the invention, wherein a guide member is associated in said push-button, and said indicator is interposed between the inner and outer peripheral surfaces of said push-button and said guide member.

The stopper for the caster as the premise of the present invention is pressed or returned through the push-button, thereby switching the caster to the locking state or the lock releasing state.

In the lock indicator according to the first aspect of the present invention, the indicator having the different indicating portions is disposed along the inner peripheral surface of the push-button having the transparent portion in the caster with the stopper, and the one end of the indicator is secured in the frame of the caster.

The indicating portions of the indicator are alternately observed and concealed from the transparent portion of the push-button upon switching of the locking state and the lock releasing state of the caster by the operation of the push-button.

More specifically, in the lock indicator according to the present invention, when the push-button is not pressed in the frame, one of the indicating portions of the indicator is observed from the transparent portion of the push-button, but when the push-button is pressed in the frame, the push-button and the indicator along the inner peripheral surface of the push-button are relatively slid. Therefore, the other one indicating portion of the indicator is observed from the transparent portion of the push-button.

As described above, each time when the push-button is pressed, i.e., each time when the caster is switched to the locking state or the lock releasing state, the indicating portions of the indicator for individually indicating these states are alternately observed from the transparent portion of the push-button. Therefore, the locking state and the lock releasing state of the caster can be easily and accurately observed through the indicating portions of the indicator.

Further, in the case of the lock indicator according to the second aspect of the present invention, the indicator in which the indicator are interposed between the push-button and the guide member is held through the push-button and the guide member. Therefore, when the push-button and the indicator are relatively slid upon operation of the push-button as described above, the indicator is not separated from the inner peripheral surface of the push-button, and the indicating portions of the indicator are reliably indicated from the transparent portion of the push-button.

BRIEF DESCRIPTION OF THE DRAWINGS

The above and other objects as well as advantageous features of the invention will become apparent from the following detailed description of the preferred embodiments taken in conjunction with the accompanying drawings.

FIGS. 1, 2, 3, and 4 are front, side, plan and developed views of an essential portion of an embodiment of a lock indicator for a caster according to the present invention;

DESCRIPTION OF THE PREFERRED EMBODIMENTS

Figure 1:
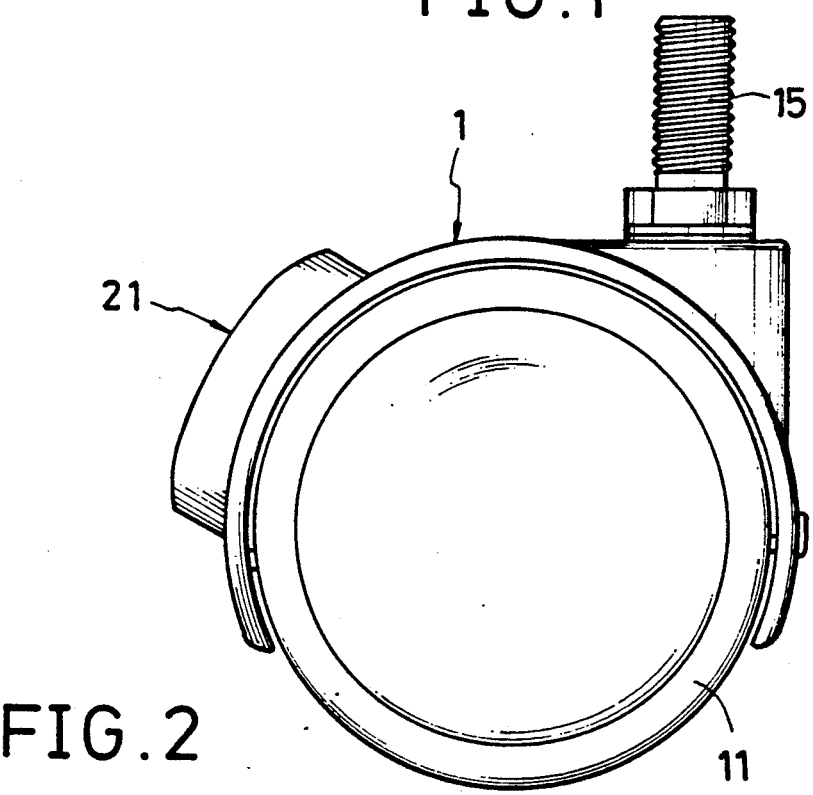

Embodiments of a lock indicator for a caster of the present invention will now be described with reference to the accompanying drawings.

The caster with a stopper to be described below has substantially the same arrangement as that disclosed by the prior invention of Japanese Patent Application No. 56-33522 (see Japanese Patent Laid-Open No. 57-14794) except the arrangement of a lock indicator.

In FIGS. 1 to 4, the lock indicator for the caster of the invention comprises a frame 1 of the caster, a wheel 11 of the caster, an axle 12 as the other of a pair of caster and axle, a mounting shaft 15 of the caster, a stopper 16 of the axle 12, a spring 19, a push-button 21, an indicator 41 mounted in the push-button 21, and a guide member 51.

The substantially arcuate outer peripheral wall of the frame 1 is integrally formed with a standing wall under the outer peripheral wall of the frame 1.

A horizontal hole 2 receiving axle 12 for mounting the wheel 11 is formed at the axial core (boss) of the frame 1, a vertical hole 3 for mounting the mounting shaft 15 is formed at one side of the frame 1, and a button mounting hole 4 for mounting the push-button 21 is opened at the other side of the frame 1 from the outer periphery thereof toward the axial core of the frame 1.

In the frame 1 described above, a wide portion 5 for increasing the width of the button mounting hole 4 and a deepened portion 6 for increasing the depth of the button mounting hole 4 are formed continuously to the button mounting hole 4 at one side of the button mounting hole 4, and a stepped portion 7 is formed at the intersection between the wide portion 5 and the deepened portion 6.

Further, a cam groove 8 is cut out integrally with the button mounting hole 4 in the bottom of the button mounting hole 4.

Figure 5:
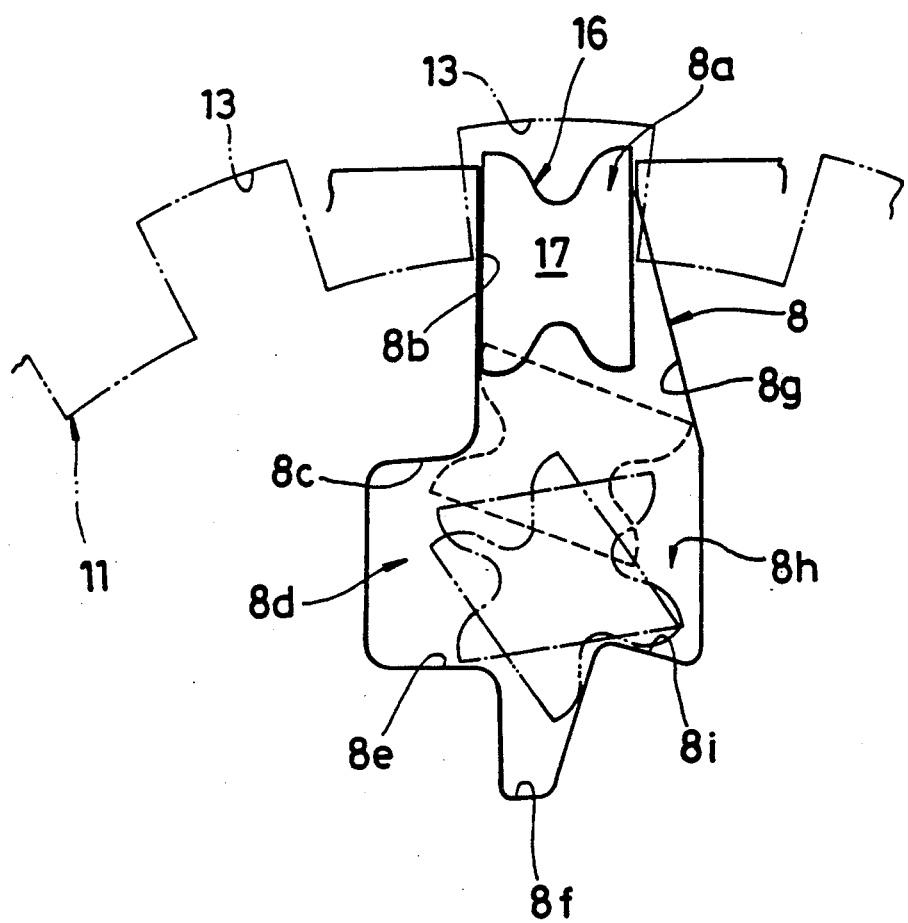
FIG. 5 is a schematic view showing the relationship between a stopper and the groove of a cam.

As shown in FIG. 5, a vertical portion 8b and a recess 8d are formed at one sidewall from an opening 8a to a bottom 8f of the cam groove 8 in the cam groove 8, an oblique portion 8b and a hook-shaped portion 8h are formed at the other sidewall from the opening 8a to the bottom 8f, and stepped portions 8c, 8e, and 8i are respectively formed at intersections between the vertical portion 8b and the recess 8d, between the recess 8d and the bottom 8f, and between the bottom 8f and the hook-shaped portion 8h.

In addition, a seat 9 of the spring 19 is formed at the side of the hole 3 of the frame 1, and a pin hole 10 is formed at the lower portion of the deepened portion 6 of the frame 1.

The wheel 11 has a number of engaging recesses 13 formed on the inner periphery thereof, and a tire, a wheel cap, etc., are mounted, as required, on the outer periphery, the outer face of the wheel 11.

Figure 10:
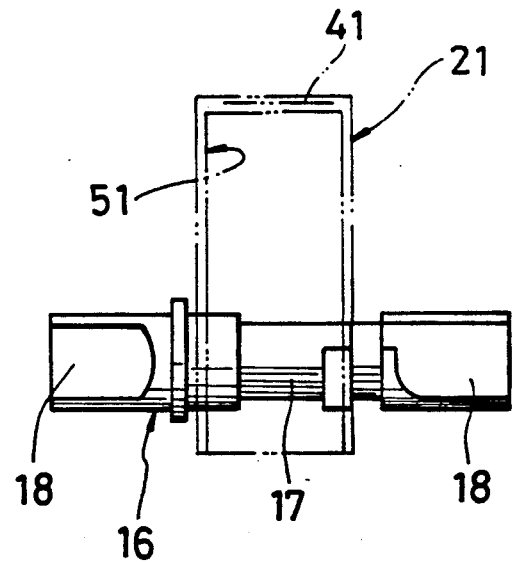
FIG. 10 is a schematic view of the assembling state of the push-button, the guide member, an indicator and a stopper of the embodiment.

As shown in FIG. 10, the stopper 16 has a rotary actuation portion 17 formed at the intermediate in the axial direction as apparently shown in FIG. 10, and engaging portions 18 to be engageably corresponding to the recesses 13 of the wheel 11 at both axial ends thereof.

The spring 19 is formed to have a coiled portion and engaging ends formed at both ends thereof known per se.

Figure 6:
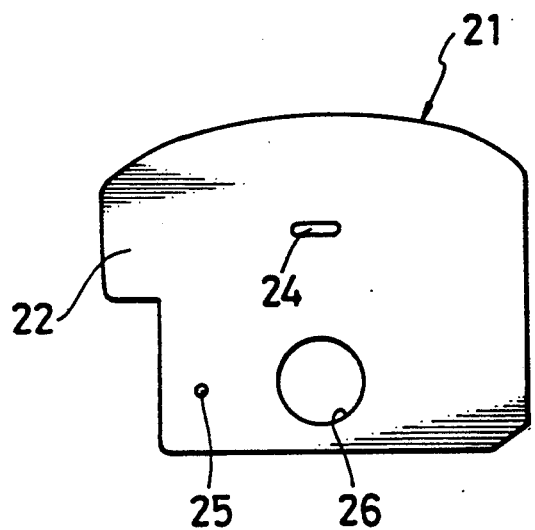
FIGS. 6, 7 and 8 are front, longitudinal front and side sectional views of a push-button of the embodiment.
Figure 7:
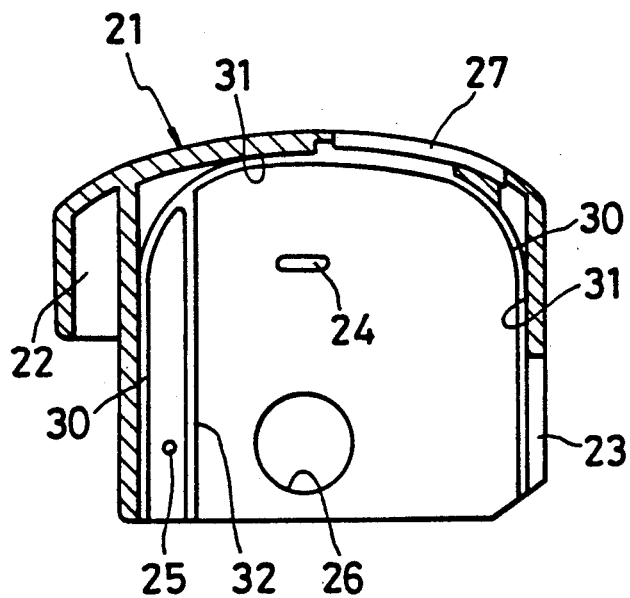
Figure 8:
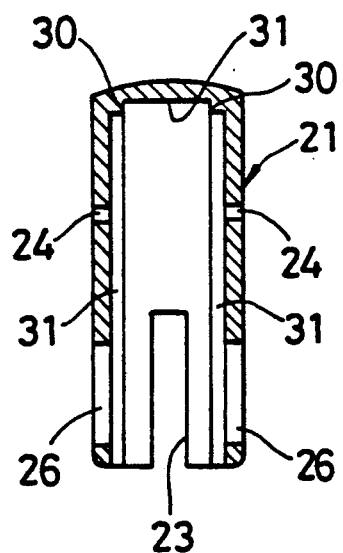

As shown in FIGS. 6 to 8, the cap-shaped push-button 21 has front and rear slender walls, wide right and left side walls, and a bent upper wall, thereby forming a flat bottomed rectangular-sectional cylindrical shape.

A projection 22 is formed on the outer surface of the front wall in the upper half portion of the push-button 21, a vertical slit 23 is formed at the rear wall in the lower half portion of the push-button 21, stopping holes 24, 25 and an axial bore 26 are formed at both sidewalls, and a transparent portion 27 is formed at the bent upper wall.

Figure 2:
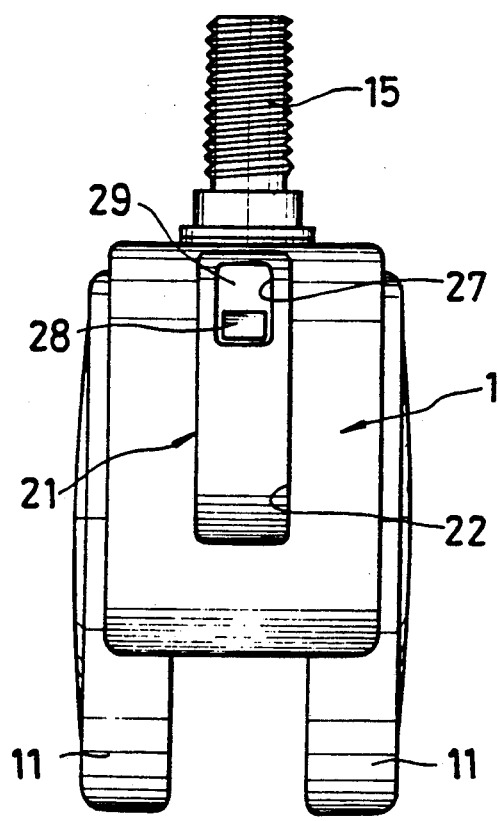

The transparent portion 27 of the embodiment as shown in the drawings is formed by opening the bent upper wall of the push-button 21, and a transparent piece 29 having a transparent portion 28 is detachably engaged with the transparent portion 27 as shown in FIGS. 2 to 4.

Further, projecting stripe portions 30 are formed at the inner corners at the intersections between the inner walls in the push-button 21, and a groove 31 is correspondingly formed oppositely to the projecting stripe portions 30 on the inner walls of the push-button 21. In addition, projecting stripe portions 32 parallel to the front wall are also formed on the inner surfaces of both the right and left side walls.

The corner of the projecting stripe portion 30 is curved in a relatively large radius of curvature.

Figure 11:
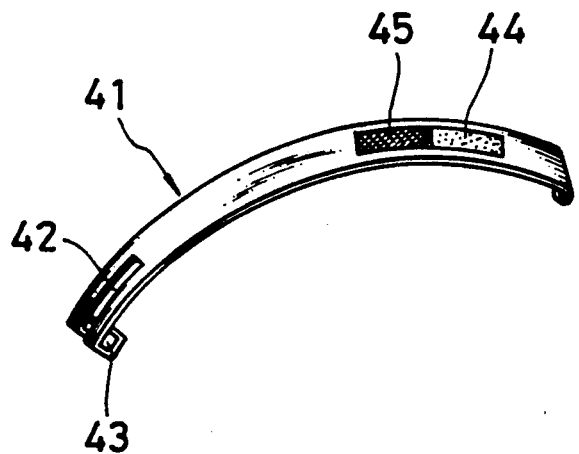
FIG. 11 is a perspective view of the indicator of the embodiment.

The indicator 41 formed of a stripe shape is formed, as shown in FIG. 11, with an axial bore 43 at one end having a slit 42, and indication portions 44 and 45 different from each other are attached to the surface of the indicator 41 at the other side than the side formed with the slit 42.

Figure 9:
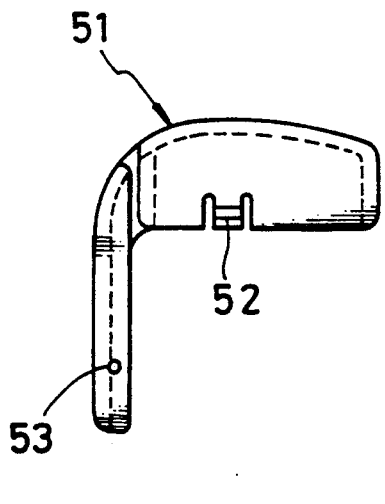
FIG. 9 is a front view of a guide member of the embodiment.

As shown in FIG. 9, the guide member 5 has an elbow shape in which a vertical portion of U-shaped section is connected to a horizontal portion of U-shaped section in such a manner that the outer peripheral surface between the vertical portion and the horizontal portion is formed substantially approximate to a predetermined inner surface of the push-button 21.

An engaging projection 52 engageably corresponding to the stopping hole 24 of the push-button 21 is formed substantially at the center of the lower side of the horizontal portion of the guide member 51, and an engaging projection 53 engageably corresponding to the stopping hole 25 of the push-button 21 is formed at the lower part of the vertical portion of the guide member 51.

The members described above are associated with each other as below.

The axle 12 is rotatably inserted into the axial hole 2 of the frame 1, and the wheels 11 are mounted at both ends of the axle 12 inserted through the axial hole 2.

The mounting shaft 15 is rotatably inserted into the axial hole 3 of the frame 1, and removal preventing means for the mounting shaft 15 is provided through a nut, a washer type split ring fastener, etc.

The indicator 41 in which the surface having the indicating portions 44, 45 is directed toward the transparent portion 27 is internally mounted along a groove 31 in the push-button 21, the guide member 51 is engaged from below the indicator 41, the stopping holes 24, 25 of the push-button 21 are respectively engaged with the engaging projections 52, 53 of the guide member 51, thereby associating the push-button 21, the indicator 41, and the guide member 51.

The stopper 16 is so rotatably associated with the push-button 21 that the central rotary actuation portion 17 is contained in the push-button 21 and the engaging portions 18 of both ends project from the axial hole 26 of the push-button 21.

The push-button 21 having the stopper 16, the indicator 41 and the guide member 51 is engaged within the push-button mounting hole 4 of the frame 1.

In this case, the rotary actuation portion 17 of the stopper 16 is engaged within the cam groove 8, and the engaging portion 18 of the stopper 16 is engageably corresponded to the engaging recess 13 of the wheel 11.

The indicator 41 interposed between the push-button 21 and the guide member 51 is bridged at the slit 42 of one end thereof over the standing wall of the frame 1, and one end of the indicator 41 is secured in the frame 1 through a pin 46 inserted into the axial bore 43 formed at one end side and the pin hole 10 of the frame 1.

The spring 19 is attached to the standing wall of the frame 1 through the coiled portion thereof, supported by a pin 47, seated at one end thereof to the seat of the frame 1, and engaged at the other end thereof with the lower side of the push-button 21.

Thus, a force of a direction projecting from the push-button mounting hole 4 is applied to the push-button 21.

When the wheel 11 of the caster is locked by the stopper 16 in the caster with the stopper of the example as shown having the lock indicator according to the present invention, the engaging portion 18 of the stopper 16 is relatively engaged with the engaging recess 13 of the wheel 11, and the rotary actuation portion 17 of the stopper 16 is exhibited in the vertical direction state in the opening 8a of the cam groove 8.

When the push-button 21 is pushed against the spring 19 into the push-button mounting hole 4 in the state that the wheel 11 is locked as described above, the stopper 16 held by the push-button 21 is moved in the same direction. Therefore, the engaging portion 18 of the stopper 16 is disengaged from the engaging recess 13 of the wheel 11, thereby releasing the locking state of the wheel 11.

When the wheel 11 is disengaged from the locking state as described above, the rotary actuation portion 17 of the stopper 16 exhibiting the vertical direction state as indicated by solid lines in FIG. 5 in the opening 8a of the cam groove 8 is moved down in the cam groove 8, and then collided with the stepped portion 8i of the cam groove 8 to be rotated counterclockwise as indicated by one-dotted chain lines in FIG. 5 (this state is the pressed limit of the push-button 21).

When the pressing force of the push-button 21 is released at this time point, the stopper 16 tends to be returned together with the push-button 21 through the spring 19, but the rotary actuation portion 17 at the time of returning on the way is collided with the stepped portion 8c of the cam groove 8 as indicated by broken lines in FIG. 5 to be further rotated counterclockwise, and the rotary actuation portion 17 exhibits a lateral state.

When the rotary actuation portion 17 of the stopper 16 becomes the lateral state, the rotary actuation portion 17 cannot pass between the vertical portion 8b and the oblique portion 8b of the cam groove 8. Therefore, the state that the engaging portion 18 of the stopper 18 is released from the engaging recess 13 of the wheel 11, i.e., the state that the wheel 11 is held in lock releasing state is maintained.

In the lock releasing state, the push-button 21 is held in the state that the push-button 21 is contained in the push-button mounting hole 4 as obviously understood.

Then, when the push-button 21 is again pressed into the push-button mounting hole 4 after the wheel 11 is released from the wheel locking state, the rotary actuation portion 17 of the stopper 16 exhibiting the lateral state is collided with both the stepped portions 8e and 8i of the cam groove 8.

Since the stepped portion 8e is disposed at a lower position and the stepped portion 8e is at a higher position in the relative relationship between the stepped portions 8e and 8i, the rotary actuation portion 17 is inclined in a counterclockwise direction as indicated by two-dotted chain lines in FIG. 5.

When the pressing force of the push-button 21 is released in this state, the stopper 16 starts to return similarly to the state described above, the rotary actuation portion 17 is collided with the stepped portion 8c of the cam groove 8 to be further rotated counterclockwise at the time of returning on the way as indicated by broken lines in FIG. 5, and becomes a vertical state. Therefore, the rotary actuation portion 17 is passed between the vertical portion 8b and the oblique portion 8g of the cam groove 8 in the vertical state, and returned to the opening 8a.

As described above, when the stopper 16 is returned, the engaging portion 18 of the stopper 16 is again oppositely engaged with the engaging recess 13 of the wheel 11 to lock the wheel 11 in the locking state.

As described above, when the wheel 11 is locked to the locking state through the push-button 21 or the wheel 11 is released to the lock releasing state, the indicator 41 indicates the respective states as will be described below.

When the engaging portion 18 of the stopper 16 is oppositely engaged with the engaging recess 13 of the wheel 11 in the locking state, the push-button 21 projects from the push-button mounting hole 4.

At this time of the state described above, the transparent portion 27 of the push-button 21 coincides with the one indicating portion 44 (the indicating portion of locking state) of the indicator 41. Therefore, such a locking state is easily identified through the transparent portion 27.

At the time of the lock releasing state in which the engaging portion 18 of the stopper 16 is disengaged from the engaging recess 13 of the wheel 11, the push-button 21 is pressed into the push-button mounting hole 4 to be contained therein.

When the push-button 21 is pressed into the push-button mounting hole 4 so as to obtain the lock releasing state, the push-button 21 is relatively slid to the indicator 41 along the inner peripheral surface thereof, and the other indicating portion 45 (the indicating portion of the lock releasing state) of the indicator 41 coincides with the transparent portion 27 of the push-button 21. Therefore, such a lock releasing state is easily identified through the transparent portion 27.

In the caster with the stopper having the lock indicator according to the present invention, as materials for forming the portions thereof, metal, rubber, synthetic resin (including FRP), composite material thereof are arbitrarily employed, and suitable materials are utilized in place.

The materials of the essential members will be exemplified below. The frame 1 is formed of a metal molded product made of aluminum, etc. The axle 12, the mounting shaft 15, the stopper 19 are formed of metallic products or metal processed products. The wheel 11 is formed of a composite material of metal and synthetic resin. The push-button 21, the guide member 51 are formed of plastic molded products. The indicator 41 is formed of a spring material made of metal or synthetic resin, and the transparent piece 29 is made of plastic.

The indicating portions 44, 45 of the indicator 41 are formed of any or combination of two or more of colors, characters, punched holes, crests and troughs of uneven state.

In case of the colors, a colorless background (background color of the indicator 41) is also included in one of the colors, and a fluorescent color is also employed.

Further, in case of the colors and the characters, the indicating portions 44, 45 are not directly attached to the indicator 41, but labels having the indicating portions 44, 45 may be adhered to the indicator 41.

In the case of the exemplified example, the transparent portion 27 is formed by opening the upper wall of the push-button 21, and the transparent piece 29 is engaged within the transparent portion 27. However, an open type having no such a transparent piece 29 may be included in the scope of the invention.

In the case of the lock indicator according to the present invention, technical matters disclosed in Japanese Patent Laid-Open No. 57-147948 already filed may also be employed.

In addition, the lock indicator according to the present invention may also be applied to casters of various types (existing products) for operating the stopper through the push-button.

In this case, the push-button of the existing caster may be altered in design to that (the push-button 21, the indicator 41, etc., ) of the present invention.

As described above, the lock indicator for the caster according to the present invention can simply and accurately confirm the locking state and the lock releasing state of the caster without special attention.

Further, the lock indicator for the caster according to the present invention holds the indicator through the push-button and the guide member. Therefore, there is no apprehension that the indicator is separated from the inner peripheral surface of the push-button at the time of operating the push-button, thereby stabilizing the operation of the push-button and positively indicating via the indicator as predetermined.

What is claimed is:

1. In a lock indicator for a caster having a wheel and a push-button engaged in a push-button mounting hole formed from the outer periphery of a frame to the interior of the frame, said push-button being freely pressed for operating a stopper for locking said wheel
said push-button being a cap-shaped body and being mounted within said push-button mounting hole, a transparent portion formed on a top portion of said push-button, and an indicator having indicating portions for respectively indicating a wheel locking state and a wheel lock releasing state in such a manner that the indicating portions of said indicator correspond to the transparent portion of said push-button, said indicator being internally mounted along an inner peripheral surface of said cap-shaped body to the top portion of said push-button, and one end of said indicator being secured into the frame.

2. A lock indicator for a caster according to claim 1, wherein a guide member is mounted in said push-button, and said indicator being interposed between inner and outer peripheral surfaces of said push-button and said guide member.

3. A lock indicator for a caster according to claim 1 wherein said push-button and frame are interconnected by spring biased means urging said push-button outwardly of the mounting hole, one of said indicating portions being aligned with the transparent portion of said push-button when the push-button has actuated the stopper of lock the caster wheel from rotation and the other indicating portion being aligned with the transparent portion of the push-button when the push-button has released the wheel for rotation.

4. An indicator for a caster wheel lock to indicate whether the wheel lock is in locked position or unlocked position, said caster wheel including a supporting frame having a rotatable wheel mounted thereon and a movable actuator for locking the wheel and unlocking the wheel, an indicator interconnecting the frame and actuator, said indicator including observable means moved to an observable position when the wheel lock actuator is in one of its locking and unlocking positions with movement of the wheel lock actuator moving the indicator to a position for observation, said wheel lock actuator being a push-button having an outer end provided with a transparent area, said indicator being disposed inwardly of the outer end of the push-button and including portions observable through the transparent area, said push-button being reciprocated between wheel locking and wheel unlocking positioned, said indicator being connected to the frame thus causing relative movement between the indicator and the push-button during reciprocation of the push-button to change the portions of the indicator observed through the transparent area.

* * * * *